(Model.)
W. H. LEININGER & O. H. P. CORNELIUS.
Whiffletree.
No. 240,030.  Patented April 12, 1881.
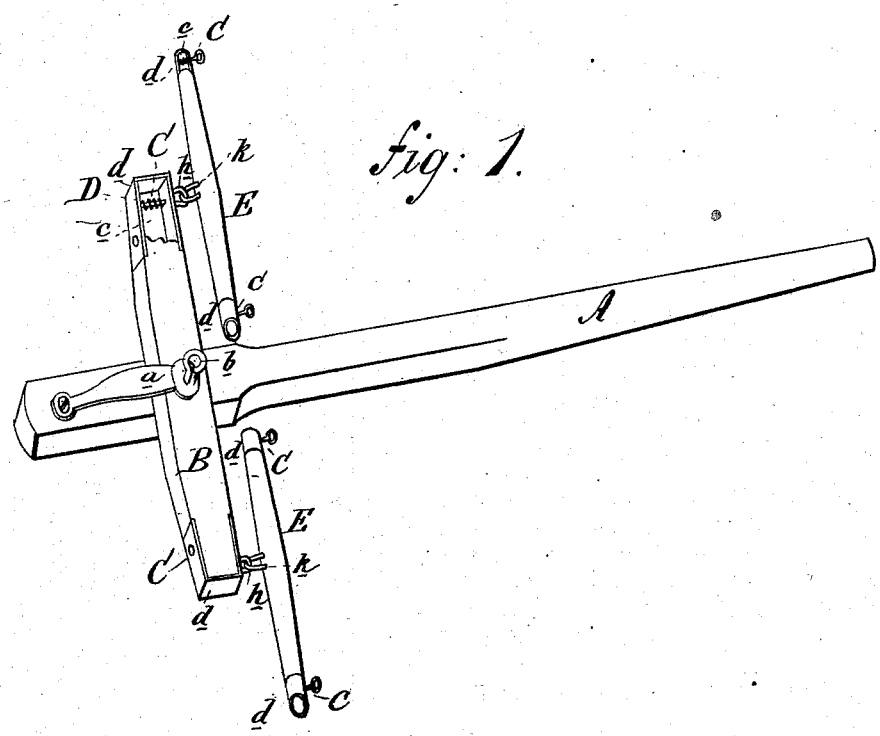
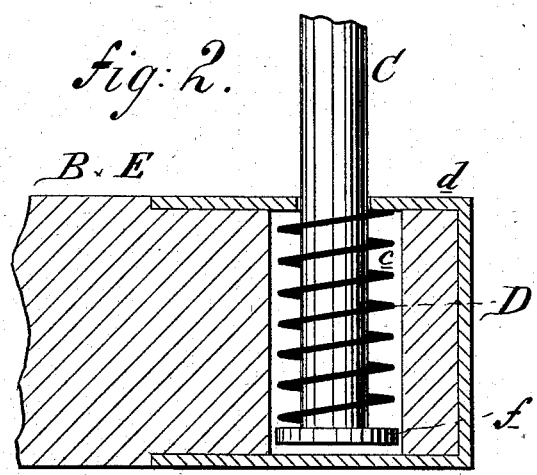
WITNESSES:
A. Schehl
C. Sedgwick
INVENTOR:
W. H. Leininger
O. H. P. Cornelius
BY Munn & Co
ATTORNEYS.

United States Patent Office.

WILLIAM H. LEININGER AND OLIVER H. P. CORNELIUS, OF SALEM, OREG.

WHIFFLETREE.

SPECIFICATION forming part of Letters Patent No. 240,030, dated April 12, 1881.

Application filed November 26, 1880. (Model.)

*To all whom it may concern:*

Be it known that we, WILLIAM H. LEININGER and OLIVER H. P. CORNELIUS, of Salem, in the county of Marion and State of Oregon, have invented a new and Improved Whiffletree, of which the following is a specification.

In hauling wagons over rough roads the necks and shoulders of the horses are apt to become chafed and bruised from the constant jarring and concussions of the vehicle.

The object of this invention is to provide a whiffletree whereby the transmission of the concussions to the horses is prevented.

The invention consists of springs set about the drawing-bolts in the ends of the double and single trees, as will be hereinafter shown and described.

Figure 1 is a perspective view of a double-tree and single-trees in position provided with our improved device. Fig. 2 is an enlarged sectional elevation of an end of a whiffletree, showing the spring and bolt in position.

Similar letters of reference indicate corresponding parts.

In the drawings, A represents the pole of a vehicle; B, a double-tree secured thereto, in the usual manner, by a hammer-spring and bolt, *a b*. In the ends of said double-tree B are sockets *c c*, and around the ends of said double-tree B are fastened the metal end plates, *d d*, to strengthen the same.

C C represent the drawing-bolts of the double-tree B, provided with heads *f f*. The ends of the said bolts C, that are provided with the heads *f f*, are inserted in the sockets *c c*, while the shanks of the said bolts C protrude through holes in the plates *d d*, and are provided with eyes *h h* on their outer ends. The said bolts C C are prevented from being drawn out from the sockets *c c* by reason of their heads *f f* being larger than the holes in the plates *d d*.

Around the bolts C C, within the sockets *c c*, are secured the springs D D, that impart elasticity to the pull upon said bolts C C.

The single-trees E E, which are connected to the eyebolts C C by staples *k k*, are also provided with end sockets, *c c*, and plates *d d*, and bolts and springs C D, like those of the double-tree B; and to the bolts C C of said single-trees E E the traces are designed to be attached.

When the vehicle-wheels suddenly meet with obstructions on the road the springs D D are gradually compressed by the pull upon the bolts C C, and when the obstructions are passed the tension of the springs D D gradually draws the bolts C C back to their primary positions. Thus by their elasticity said springs D D prevent the transmission of the concussions caused by the meeting of the wheels with obstructions, and thereby save the necks and shoulders of the horses from chafes and bruises.

Having thus fully described our invention, we claim as new and desire to secure by Letters Patent—

A double whiffletree provided with draft-bolts C, having an eye at one end, a head at the other, and a retracting-spring between the head and end plate, *d*, as and for the purpose specified.

WILLIAM H. LEININGER.
OLIVER H. P. CORNELIUS.

Witnesses:
G. W. LEWISON,
HORACE SMITH.